Feb. 20, 1923.
F. MAUS.
METHOD OF COOLING AND DEHYDRATING MATERIALS.
FILED FEB. 1, 1921.
1,446,054
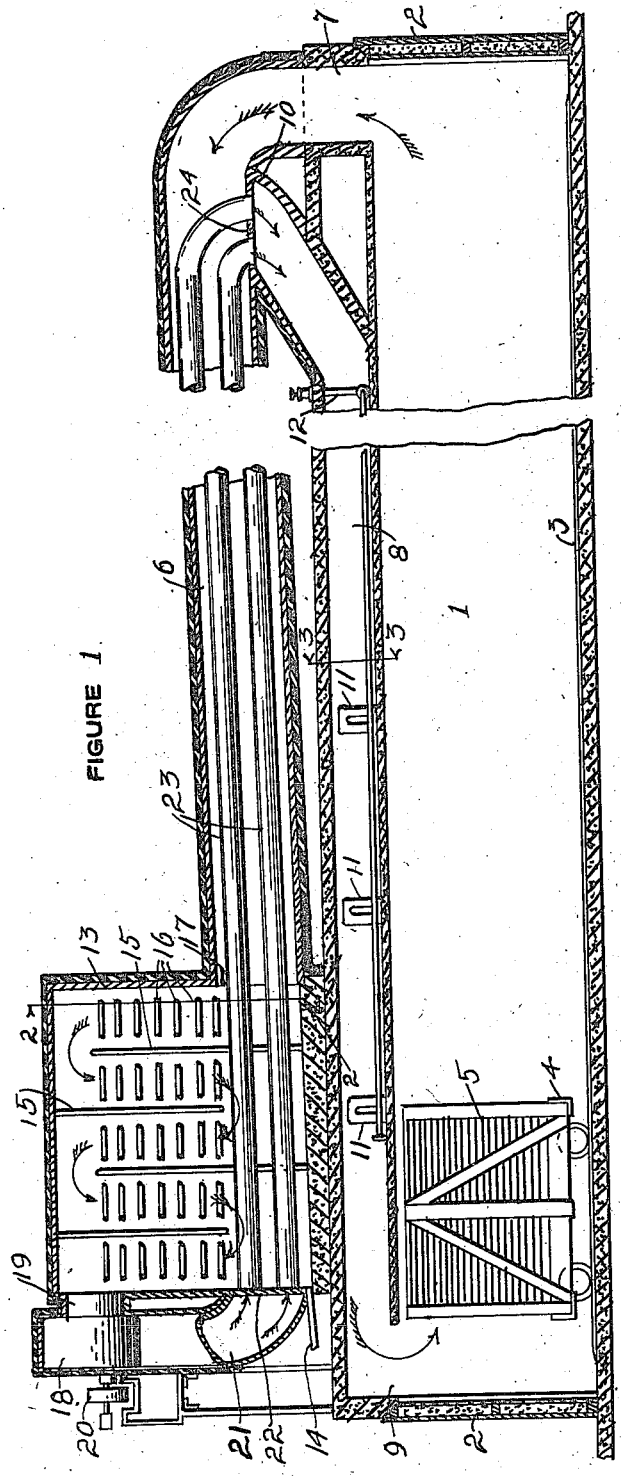
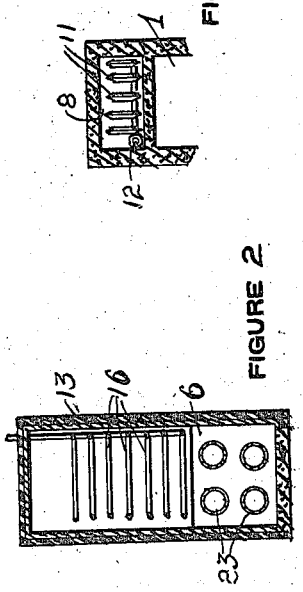
INVENTOR
Frank Maus
John A. Naismith
BY
ATTORNEY Patented Feb. 20, 1923.

1,446,054

UNITED STATES PATENT OFFICE.

FRANK MAUS, OF SAN JOSE, CALIFORNIA, ASSIGNOR OF ONE-HALF TO SIEBREN J. SPOELSTRA, OF SAN JOSE, CALIFORNIA.

METHOD OF COOLING AND DEHYDRATING MATERIALS.

Application filed February 1, 1921. Serial No. 441,608.

*To all whom it may concern:*

Be it known that I, FRANK MAUS, a citizen of the United States, and resident of San Jose, in the county of Santa Clara and State of California, have invented certain new and useful Improvements in Methods of Cooling and Dehydrating Materials, of which the following is a specification.

This invention relates to a method of dehydrating and cooling by means of dry air below a given temperature.

It is the object of my invention to provide a method wherein certain classes of material requiring slow treatment may be dehydrated at a low temperature, and wherein heat introduced into the dehydrator by the material itself and the carriers therefor is utilized to supply sensible heat and latent heat of evaporation. It is a further object to provide a method in which a minimum amount of heat is introduced from an outside source (in addition to the heat supplied by the material and carriers) and in which the dehydrated material is delivered from the dehydrator at a proper temperature for storage. A still further object is to provide a method in which the material is at one and the same time subjected to the dehydrating action of dry air and the cooling action of cold air.

In the drawing:—

Figure 1 is a vertical and longitudinal section through my improved dehydrator and cooler, part being broken away.

Figure 2 is a section on line 2—2 of Figure 1.

Figure 3 is a section on line 3—3 of Figure 1.

Referring more particularly to the drawing, I provide at 1 a heat insulated tunnel or chamber fitted with doors 2—2 and a track 3 upon which suitable trucks as 4 are mounted carrying trays 5 laden with material such as prunes, nuts, apricots, etc., to be dried and cooled.

At 6 is shown a slightly inclined heat insulated conduit arranged over tunnel 1 and communicating directly with one end thereof as at 7. A passage 8 is arranged over chamber 1 and communicates therewith at the end opposite to the passage 7 and terminates at point 10 adjacent said passage 7. A series of heating units as steam radiators are arranged in passage 8 as at 11, a supply pipe being shown at 12.

Over chamber 1 and passage 8 at end 9 thereof is built a heat insulated chamber 13 provided with a drain at 14, a series of baffle plates at 15 and refrigerating coils at 16. This chamber 13 has open communication at 17 with conduit 6 and through conduit 6 with tunnel or chamber 1. At 18 is shown a fan communicating with chamber 13 at 19 and operated through the medium of a pulley at 20, a discharge pipe being shown at 21 terminating in a plate 22 into which are set the ends of pipes 23. Pipes 23 are arranged in conduit 6 and extend from pipe 21 to the end 10 of passage 8 with which they communicate through plate 24 in which they are mounted.

Assuming then that the fan 18 is operating, the air in the dehydrator will move in the direction indicated by the arrows, namely, past the heat units 11 to end 9 and then through the dehydrating and cooling chamber 1, thence through passage 7 and conduit 6 around pipes 23 to condenser chamber 13 where it passes around the refrigerating coils to fan 18. From fan 18 the air passes through pipe 21 and pipes 23 to be discharged into passage 8 again.

In operating this dehydrator under the method claimed, the cold dry air passing through pipes 23 takes up enough heat from the dehydrating air passing through conduit 6 to materially raise its temperature, at the same time lowering the temperature of the dehydration air in conduit 6. The air discharged from conduits 23 is not in most cases sufficiently heated for effective use, therefore sufficient heat is added thereto by heating units 11 to raise its temperature to a point less than the temperature of the material about to be discharged from the chamber. This air now picks up moisture from the material treated and the moist air stores up latent heat of evaporation and sensible heat from the material treated and the carriers therefor, the material having been introduced into chamber 1 at a higher temperature than the atmospheric air the temperature of the air gradually rises as it passes to air discharge passage 7 and the temperature of the material and carriers gradually lowers as they pass to the discharge doors of the chamber. When the air leaves the dehydrating chamber its temperature is higher than when it entered the chamber because it has stored up heat as well as moisture, the heat being subsequently given up in conduit 6 and refrigerating chamber 13.

It is now clear that by cold dry air dehydration is meant, as indicated above, one in which the dry air enters the dehydrating chamber at a lower temperature than the material treated and the carrier therefor, whether the said material and carries be previously heated by natural means or by artificial means, and in which the material is gradually cooled to a desired temperature and at the same time reduced in moisture content.

By the process as above set forth the material entering the cooling chamber is not subjected to a sudden drop in temperature and humidity and therefore rendered liable to become case hardened, but the temperature and humidity of the air in the chamber gradually lessens as the material passes therethrough.

In a process of this kind, of course, the temperature and degree of humidity are merely relative. Since the process is in most cases finished at about the temperature of the atmosphere at the time, it is conceivable that the temperature of the material when discharged from the dehydrator may vary throughout a wide range of temperature, say from zero degrees on a cold day to ninety degrees or more on a warm day. Wherever degrees of temperature are referred to they are to be read with reference to the Fahrenheit scale.

It is to be understood that in a closed circuit cold dry air cooler and dehydrator of this type heaters as 11 are not always required as the heat introduced into the chamber 1 by the incoming material and carriers may be sufficient to raise the temperature of the air therein to such a point that it will in turn impart the requisite amount of heat to the dried air passing through conduits 23. The materials treated, of course, pass through chamber 1 in an opposite direction to the flow of air therethrough.

It is to be further understood that while I have herein disclosed one specific embodiment of my invention the disclosure is to be considered as illustrative only and in no way to limit the scope of the appended claims.

I claim:—

1. The process of cooling and dehydrating materials which consists in simultaneously and progressively reducing the temperature and the moisture content of the materials treated.

2. The process of cooling and dehydrating materials which consists in circulating air of lower temperature than the material treated around said material to reduce the temperature and moisture content thereof, cooling and drying said air, and utilizing a portion of the heat of said air during cooling and drying to raise the temperature of the same after cooling and drying.

3. The process of dehydrating and cooling materials which consists in moving the material to be treated through air cooler and dryer than said materials and moving in an opposite direction thereto whereby the temperature and moisture content of the material are gradually lowered and the temperature and moisture content of the said air correspondingly augmented.

4. The process of dehydration and cooling which consists in precooling the dehydration air, raising the temperature thereof to a point near the temperature of the said material but below the same, subjecting the material to the action of said air whereby heat is transferred from said material to said air, and utilizing said heated air to raise the temperature of the cooled air prior to subjecting the material to the action thereof.

FRANK MAUS.